Patented Mar. 27, 1923.

1,449,976

UNITED STATES PATENT OFFICE.

HENRY V. DUNHAM, OF MOUNT VERNON, NEW YORK.

OIL PRODUCT AND PROCESS OF MAKING SAME.

No Drawing.  Application filed April 9, 1921.  Serial No. 460,031.

*To all whom it may concern:*

Be it known that I, HENRY V. DUNHAM, a citizen of the United States, residing at Mount Vernon, in the county of Westchester and State of New York, have invented certain new and useful Improvements in Oil Products and Processes of Making Same, of which the following is a specification.

The present invention relates to the production of a dry product which, when mixed with water, produces a fine and relatively stable emulsion containing "industrial fatty oils," under which term are included the fatty oils, that is to say, the oils that are used in the industries as distinguished from edible or medicinal oils. The invention of the present application has no relation whatever to the production of medicinal compounds or food compounds or ingredients to be used in the preparation of either. Nor has it any reference to compositions containing edible oils nor to the production of such compounds. The invention relates rather to the use of "industrial fatty oils" namely oils which are used for coatings, for leather stuffing, as a medium for making dry cold water paints, cloth finishing or coating and similar uses.

The oils referred to in the present case are, in many cases, oils of a drying nature or oils or oil mixtures capable of hardening under certain circumstances.

The oil in question is emulsified in a suitable liquid, for example an albuminous liquid such as casein dissolved in alkali. The oils may be used alone or in mixtures with other oils (drying or not drying), waxes, greases, pigments or dyes or other filling or conditioning agents. The resulting mixture is then homogenized, for example by being passed one or more times through a suitable homogenizer under a pressure from 3000 to 10,000 pounds per square inch, the resulting product is then dried. The amount of oil in the final product will, of course, depend upon the proportions of the ingredients used in the process and this proportion may vary from 20% up to 70%, and in some cases the range of proportions may be even wider than this. In order to more fully illustrate the invention, the following examples are given, it being understood that the examples are given purely for the purposes of illustration and not as restricting the invention thereto.

Example 1: 100 parts of casein are completely or substantially completely dissolved in 400 parts of water with the aid of sufficient alkali such as sodium carbonate to make a perfect solution, which solution may be either neutral or somewhat alkaline to litmus paper. The solution may be, if desired, filtered from any undissolved casein. To this solution are added 200 parts of ordinary linseed oil and the mixture violently agitated to emulsify the oil to some extent. The emulsion is then passed through a homogenizer under a pressure of say 3500 to 6000 pounds to completely homogenize the same. The resulting creamy liquid is then dried in any suitable manner, for example on a "Just" milk drying machine of the double cylinder type. The resulting product contains about 33% of casein to 66% of oil. This product is stable and will keep for a considerable period in ordinary relatively tight packages, such as paper bags. When this product is stirred up with cold water or warm water it forms a relatively stable emulsion containing the oil particles in a finely divided state, and this liquid can be for various purposes, for example as a coating on leather or split leather or as a coating on fabric in the production of artificial leather.

Example 2: A mixture of blown oils, containing one-half of rapeseed oil and one-half of linseed oil, boiled and then blown to produce a very viscous, sticky mass, much thicker and much more viscous than ordinary molasses, of a yellowish brown color, is mixed with a solution of alkali casein as in Example 1. The procedure as in Example 1 is then continued, to produce the dry, flaky or pulverulent product.

In another example, three parts of the blown oil mixture may be combined with a solution containing one-half part of casein and one-half part of soap. A small amount, say one-half part, of a water soluble oil, such as Turkey-red oil, may also be incorporated if desired, at any stage prior to the end of the homogenization operation.

Example 3: In this example boiled linseed oil is selected, ordinary linseed oil being boiled in the usual manner, with a small quantity of lead oxid or other drier. A 10% warm solution of gelatine was used as the vehicle in which to emulsify the oil. The quantities of materials were approximately two parts of boiled linseed oil to one part of dry gelatine. The homogeneous product was dried as above indicated. In another similar example egg albumen was used as the aqueous liquid, the drying operation being performed in a vacuum drier.

Waxes, greases, lanolin and the like, may be employed with the oils in question, these materials acting to some extent as thickening agents. An example illustrating this is as follows: 136 parts of carnauba wax is mixed with 21 parts of paraffin wax by being melted together. The warm mixture is added to 628 parts of raw linseed oil and the mixture agitated to thoroughly mix the same. 10 parts of this oil and wax mixture are mixed with a solution of 5 parts of casein in 20 parts of water containing 1½ parts of sodium bicarbonate. The mixture thereby produced is then completely homogenized by being passed through a homogenizing apparatus under a pressure of about 5000 pounds per square inch. The resulting creamy liquid is dried on a "Just" milk drier.

This dry product, on being dissolved up in water produces an emulsion which is particularly useful for application to split leather to produce patent leather, several different coats being successively applied and dried.

Example 4: Crude fish oil is mixed with waxes and with "Turkey-red" oil and with sulfonated oils and sulfonated waxes. This mixture is emulsified with casein solution, homogenized and dried. Good proportions are 65 parts of the wax-oil mixture to 35 parts of casein.

Example 5: 3 parts of paraffin wax is melted and mixed with a concentrated solution containing one-half parts of soap and 1⅛ parts of casein dissolved in a little alkali and the mitxure treated as above indicated. This product, when dissolved, can be used for stuffing leather, or for a liquid in which to incorporate calcimine compounds.

Example 6: A mixture of two pounds of paraffin wax, one pound of lanolin (crude) and one-half part of castile soap is mixed with a casein solution in the proportions of about half and half and the operation continued as in Example 1. This product is particularly useful for finishing and stuffing soft leathers.

In the homogenization operation, particularly when the highly viscous oils are employed, it is often advisable to pass the mixture several times through the homogenizer, this mixture being first passed through the homogenizer at a relatively low pressure, then passed through again several times under successively increasing pressures. It is well understood in the art that by tightening up the discs of the homogenizer, greater pressure will be necessary to force the liquid through the homogenizer. Thus when using the highly viscous oil material, with or without wax, and an aqueous solution containing alkali casein, soap and the like, the liquid may be passed four or five times through the homogenizer, the pressure in the first operation being, say 3000 pounds per square inch and in the last operation being 8000 or even 10,000 pounds per square inch. This produces a very thorough and very fine homogenization The expression "industrial edible fatty oil as specified," where used in the appended claims, includes such oils as above indicated, but not edible oils nor medicinal oils.

I claim:

1. A dry solid material which when mixed in a pulverulent condition with water, will produce a substantially complete and relatively stable emulsion, such solid containing an industrial inedible fatty oil as specified.

2. A dry solid material which when mixed in a pulverulent condition with water, will produce a substantially complete and relatively stable emulsion, such solid containing an industrial inedible fatty oil as specified together, with a wax.

3. A dry solid material which when mixed in a pulverulent condition with water, will produce a substantially complete and relatively stable emulsion, such solid containing an industrial inedible fatty oil as specified and a carrier comprising a soluble casein compound.

4. A dry solid material which when mixed in a pulverulent condition with water, will produce a substantially complete and relatively stable emulsion, such solid containing not less than 30% of an oxidized oil.

5. A process which comprises mixing an industrial inedible fatty oil as specified with a proteid liquid, homogenizing the mixture and drying the product.

6. A process which comprises mixing an industrial inedible fatty oil as specified carrying a dissolved oil-soluble material, with a proteid liquid, homogenizing the mixture and drying the product.

7. A process which comprises mixing an industrial inedible fatty oil as specified with a solution containing casein, homogenizing the mixture and drying the product.

8. A process which comprises mixing a thickened industrial inedible fatty oil as specified with a proteid liquid, homogenizing the mixture and drying the product.

9. A process which comprises mixing a boiled linseed oil and greasy thickening agent, with a proteid liquid, homogenizing the mixture and drying the product.

10. A dry solid material which when mixed in a pulverulent condition with water, will produce a substantially complete, and relatively stable emulsion, such solid containing a thickening material.

In testimony whereof I affix my signature.

HENRY V. DUNHAM.